Dec. 5, 1961  C. V. TILDEN  3,011,367
METHOD OF MAKING DRILL BIT
Filed March 17, 1959  2 Sheets-Sheet 1
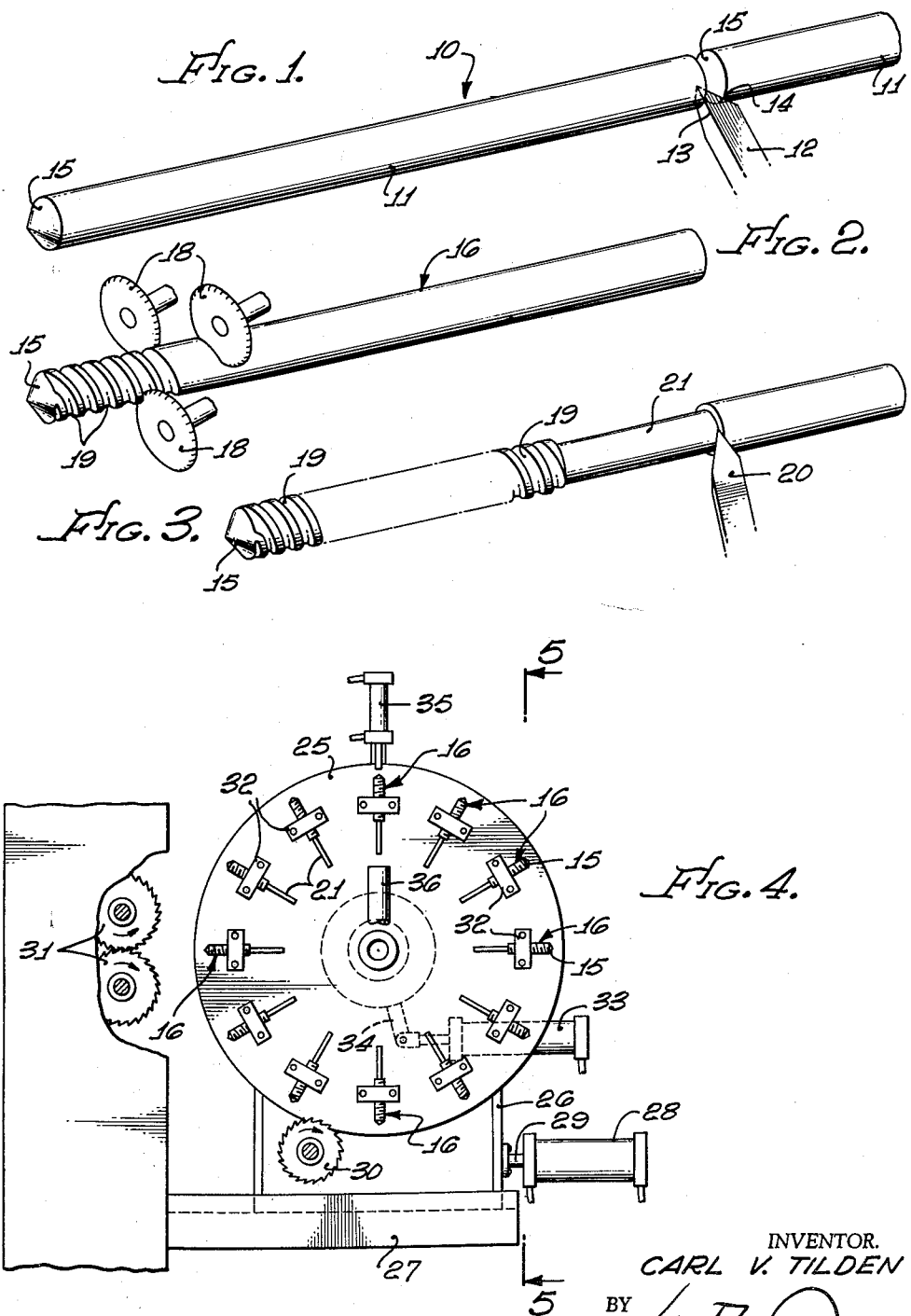
INVENTOR.
CARL V. TILDEN
BY
ATTORNEY.

Dec. 5, 1961  C. V. TILDEN  3,011,367
METHOD OF MAKING DRILL BIT
Filed March 17, 1959  2 Sheets-Sheet 2
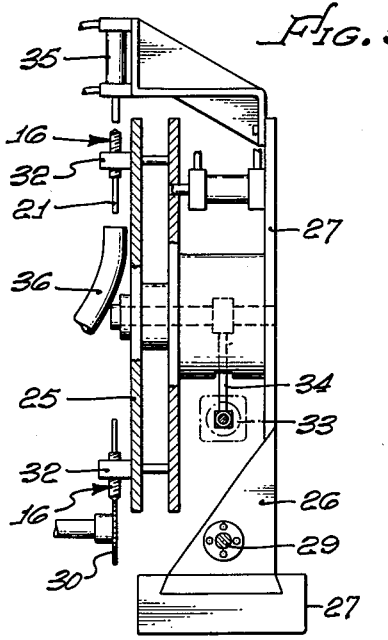
Fig. 5.
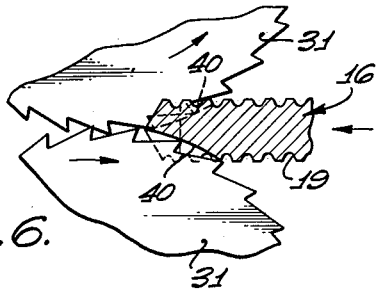
Fig. 6.
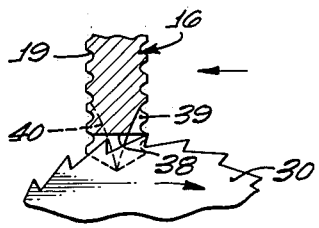
Fig. 7.
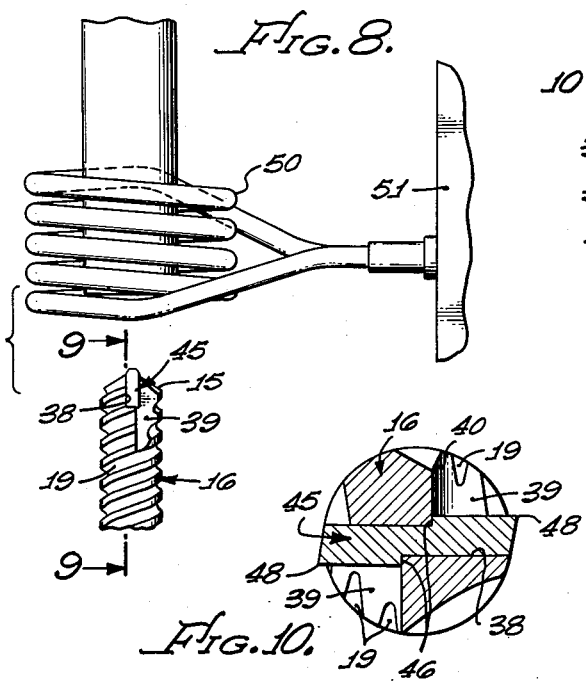
Fig. 8.
Fig. 10.
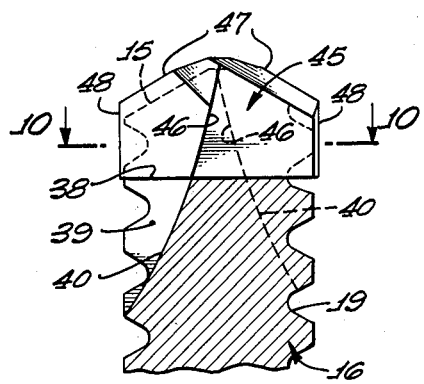
Fig. 9.
INVENTOR.
CARL V. TILDEN
BY
ATTORNEY.

United States Patent Office 3,011,367
Patented Dec. 5, 1961

3,011,367
METHOD OF MAKING DRILL BIT
Carl V. Tilden, Capistrano Beach, Calif., assignor to Village of Deming Municipal Corporation, Deming, N. Mex., a corporation of New Mexico
Filed Mar. 17, 1959, Ser. No. 799,893
7 Claims. (Cl. 76—108)

This invention relates to the manufacture of drill bits and more particularly to an improved progressive method for processing rod stock to provide a completed drill bit having accurately mounted in its cutting end without the aid of jigs or assembly fixtures a pre-formed cutting tip of special abrasion resistant material.

The present application is a continuation-in-part of applicant's co-pending application for United States Letters Patent Serial No. 672,231, filed July 16, 1957, now Patent No. 2,902,260, for Drill Bit and is directed to a preferred method of forming and accurately assembling the components of the drill bit article therein specifically disclosed and claimed.

It is a primary object of the present invention to convert commercial lengths of cylindrical steel rod stock into precision drill bits particularly suitable for use in drilling rock, concrete and the like brittle materials. More particularly, it is an object to provide a method of manufacturing a bit of this type having accurately fixed to the cutting end thereof a pre-formed cutting element of the type customarily formed from powdered materials sintered together in a casting having accurately dimensioned and shaped cutting edges. The invention features a method of so preparing the two principal components of the bit as to provide cooperating complemental positioning shoulders on each effective accurately to center the tip on the drill body without need for special fixtures, jigs or other positioning facilities. Once the components are properly assembled and centered, they are subjected to brazing or welding temperatures and fused rigidly together. Owing to the described means for assuring the accurate positioning and centering of the components, the drill bit product discharging from the welder is ready for the market without need for finish grinding or sharpening of any nature and with full assurance of precise uniformity among the drills produced by the method of this invention. By supporting the drill body with the tip seating end uppermost, the complemental positioning surfaces of the body and of the drill tip function automatically with the aid of gravity to position the components in position for welding without need for special checking jigs, templates, assembly fixtures or skilled labor.

Accordingly, it is a primary object of the present invention to provide an improved inexpensive mode of manufacturing a drill bit from rod stock and a pre-formed cutting tip of special material utilizing a minimum of labor and without need for check gauges, special jigs or assembly fixtures.

Another object of the invention is a method for mounting a preformed cutting tip in a drill body utilizing self-centering complemental surfaces of the parts to assure that the cutting edges extending crosswise of the tip as well as lengthwise of the drill body will be accurately and automatically centered with respect to the drill body axis.

Another object of the invention is the provision of a precision method of centering pre-formed cutting tips in a drill bit by providing the drill body with a mounting slot together with mutually cooperating self-centering shoulders on the tip and on the drill body effective to guide the tip into a desired assembly with precision and in readiness to be rigidly secured in this position.

These and other more specific objects will appear upon reading the following specification and claims and upon considering in connection therewith the attached drawings to which they relate.

Referring now to the drawings in which a preferred embodiment of the invention is illustrated:

FIGURE 1 is a fragmentary perspective view showing an initial step employed in forming a drill bit from long lengths of rod stock;

FIGURE 2 is a similar perspective view showing the tip end of a drill body being cold rolled to form spiral chip conveying grooves;

FIGURE 3 is a view similar to FIGURE 2 showing a subsequent operation in which the shank end is being machined to form a reduced diameter mounting shank;

FIGURE 4 is a fragmentary view of one form of apparatus conveniently used to support a plurality of drill bodies while indexing them sequentially past milling stations for notching the cutting tips of the drill bodies;

FIGURE 5 is a fragmentary sectional view taken along line 5—5 on FIGURE 4 showing additional details of the milling machine;

FIGURE 6 is a fragmentary view on an enlarged scale showing the manner of milling simultaneously both chip clearance passages;

FIGURE 7 is a view similar to FIGURE 6 but showing the manner of milling the drill body tip to form the cutting element seating slot;

FIGURE 8 is a fragmentary view of suitable means employed in fuse welding the cutting tip to the drill body;

FIGURE 9 is an enlarged sectional view through the cutting tip prior to welding and taken along line 9—9 on FIGURE 8; and FIGURE 10 is a cross-sectional view of the drill tip taken along line 10—10 on FIGURE 9.

A preferred mode of practicing the present invention will now be described, reference being had initially to FIGURES 1 to 3, it being pointed out that the various forming steps and procedures shown and described are but illustrative and the several steps and the manner of performing these steps may be carried out in other ways without departure from the essential features and principles here sought to be protected. Steel rod stock 10 of suitable composition and quality in commercial lengths of 30 to 40 feet and having a diameter approximating that desired in the cutting end of the finished bit product may be cut into suitable lengths 11, 11 by use of appropriately shaped cutting tool 12 having one edge 13 disposed to cut off the shank end along a generally radial line and a second edge 14 disposed to cut the adjacent end of the next section to provide a generally conical end 15. The individual drill bit bodies 16 may then be passed through a conventional type of thread rolling apparatus employing a plurality of round-edged rollers 18, 18 appropriately spaced about the periphery of the drill body and arranged to be pressed under high pressure into the drill body surface at an angle to form triple pitch helical chip-conveying grooves 19 along substantially one-half of the bit body. Inasmuch as the thread rolling technique employing rollers 18 is well known to those skilled in the thread rolling art, it is unnecessary to describe or illustrate this step of the operation in greater detail.

Thereafter, or simultaneously with the forming of spiral grooves 19, the opposite end of the drill body may be machined by cutting tool 20 to form a mounting shank 21 of reduced diameter. Alternatively, shanks 21 may be cut from the proper size rod stock and one end may be brazed within seating wells formed in one end of the helically threaded drilling end of the bit. According to still another mode of forming the drill body, the full length of rod stock 10 may be simultaneously spirally grooved and machined to form the drill shanks 21, following which rod 10 is severed into individual drill bodies 11, 11.

The precision milling of the cutting end of drill bit bodies 16 is facilitated by clamping a plurality of these bodies about the face of an indexing wheel 25 mounted for rotation about a horizontal axis on a pedestal 26 slidably supported in a main base 27. A rigidly supported cylinder 28 encloses a piston having a piston rod 29, the outer end of which is fixed to one end wall of pedestal 26, it being understood that this piston is operable to move the pedestal to and fro lengthwise of base 27 and into and out of milling relation to a slotting cutter 30 and a pair of clearance passage cutters 31, 31.

As is best shown in FIGURE 4, drill bit bodies 16 are mounted in clamping chucks 32 mounted on the face of indexing wheel 25 and operable to support bodies 16 with cutting end tips 15 facing radially outward and uniformly spaced from the axis of indexing wheel 25. Both sets of milling cutters are supported independently of pedestal 26 and are effective to mill a pair of drill bits 16 simultaneously, the bit located in the six-o'clock position being slotted diametrically of its end by cutter 30 at the same time that a second drill bit in the nine-o'clock position is being formed with a pair of clearance passages by cutters 31, 31. Following each withdrawal of wheel 25 to the right as viewed in FIGURE 4, suitable indexing means such as a hydraulic cylinder 33 connected through link 34 with wheel 25 through any suitable ratchet or the like mechanism operates to index wheel 25 to bring a different pair of bit bodies 16 opposite the milling cutters 30, 31. As a result, during each to and fro movement of pedestal 26, a different pair of drill bits are slotted and formed with chip clearance passages. When the milled drill bits reach an unloading station here shown as at the twelve-o'clock position, automatic clamp releasing mechanism utilizing a hydraulic cylinder 35 in a manner forming no part of this invention, functions to release chucking means 32 allowing a milled bit to drop into a duct 36 conveying the bit into an indexing chuck for the final assembly operation of the bit body and the cutting tip.

Referring now to FIGURES 6, 7, 9 and 10, there will be described structural details of the tip seating slot and of the tip clearance passages. It is pointed out that the seating slot, the chip passages, and the structural details of the cutting tip are identical with those of the aforementioned copending application. Tip seating slot 38 is of uniform width formed diametrically of the drill tip with its bottom surface normal to the bit axis. Slot 38 is formed by a thin milling cutter 30 as the rigidly supported drill bit is moved to the left as viewed in FIGURE 7 across the revolving cutter.

Chip conveying passages 39, 39 extend generally lengthwise of the drill bit with one side wall parallel to the bit axis, the other side wall being arcuate and diverging from the bit axis. These two clearance passages 39 occupy diagonally disposed quadrants each opennig into the opposite side walls of seating slot 38 in the manner best shown in FIGURE 10. It will be understood that milling cutters 31, 31 used to form passages 39 are parallel to one another and offset slightly to either side of a plane bisecting slot 38 and coincident with the axis of drill bit 16. It will be recognized that cutters 31, 31 are preferably so adjusted that their adjacent faces are substantially coincident with the adjacent side walls of slot 38. Note from FIGURE 6 that bit 16 is advanced between the cutters with its axis substantially tangential to the peripheries of the cutters at a point lying close to a vertical line drawn between the respective axes of the cutters. In consequence, milling cutters 31 form chip clearance passages 39 each having an arcuate surface 40 diverging from the bit axis and traversing several chip conveying grooves 19, 19 in the manner best illustrated in FIGURES 6 and 9.

Cutting tip 45 is preferably pre-formed or cast by powdered metallurgy technique from sintered tungsten carbide or the like special material known to be highly resistant to abrasion and wear at elevated operating temperatures. This tip is cast to fit loosely between the side walls of seating slot 38 and its opposite sides are provided near the center of tip 45 with divergent seating shoulders 46, 46 complemental to arcuate surfaces 40, 40 of chip clearance passages 39. It will therefore be understood that shoulders 46, 46 constitute, in effect, a conical pilot cooperating with diverging surfaces to guide cutting tip 45 accurately into assembled position in seating slot 38.

The exposed end of tip 45 is formed with oppositely flaring inclined cutting edges 47 disposed in the manner shown in FIGURE 9 and is also provided with a pair of cutting edges 48, 48 parallel to one another and to the axis of the drill bit but projecting slightly beyond the adjacent sides of the grooved body of the drill. It will be understood that cutting edges 47 also project slightly beyond the conical end 15 of the drill body and that conical end 15 serves to back up cutting tip 45 substantially over the entire side wall thereof.

In the final assembly operation a group of drill bits 16 are chucked vertically in an indexing wheel not shown as received from duct 36 with conical tips 15 uppermost. Cutting tips 45 are then inserted vertically downwardly into slot 38 in a generally centralized position between the ends of slot 38. Thereafter, as they are shifted downwardly in slot 38, diverging shoulders 46 of the cutting tip cooperate with the complemental surfaces 40 of clearance passageways 39 to center the tip with precision centrally of the drill. Prior to the assembly operation, tip 45 or slot 38, or both, may be coated with a suitable brazing compound or welding flux. Thereafter, the supporting chuck wheel is rotated beneath a suitable heating means, such as the induction heating coil 50 mounted on a reciprocal support 51. Once indexed into welding position, heating coil 50 is lowered to embrace the upper end of drill 16 and is held there only for the brief interval required to fuse the brazing compound. To be noted is the fact that no jigs or assembly fixtures of any kind are required to center tip 45 or to check its position before or after welding. In fact, the only check made by the operator is to determine that cutting tip 45 is bottomed against the lower surface of slot 38. If it is, it is known that the cutting tip is accurately and precisely centered.

Although the foregoing description of the preferred method of making and assembling the drill bit is the preferred method of manufacture, it will be understood that variants may be resorted to within the scope of this invention. For example, the slotting operations may be performed without the aid of the indexing equipment shown in FIGURES 4 and 5 and separately and independently of one another. For example, each slotting operation may be performed while holding the bit chucked in a stationary support and by moving the milling cutters relative to the stationary bit. Also, other techniques may be employed to anchor the pre-formed cutting tips in place in slot 38 such as clamping screws carried in the body of the drill bit proper. Also, the helical chip conveying grooves could be milled into the body of the drill bit.

While the particular method of making drill bit herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. That method of making a drill bit adapted for use in drilling rock and the like materials which comprises cold rolling chip conveying grooves spirally about one end of a steel rod having a reduced diameter shank end, indexing a plurality of said grooved rods past power-driven milling cutters operable to mill a cutter seating slot diametrically across the grooved end of said rod and a pair of diametrically opposed chip clearance passages opening through the opposite side walls of said seating slot with a surface of each diverging from the drill axis rearward toward the shank end thereof, utilizing said diverging surfaces of said clearance passages to center automatically and accurately a cutting tip formed to have a close sliding fit with the walls of said seating slot and including diverging shoulders on the opposite faces thereof positioned to engage the juxtaposed diverging surfaces of said clearance grooves as said cutting tip is being assembled into fully seated position in said slot, and then securing said accurately centered cutting tip rigidly in assembled position in said slot.

2. That method of makng a drill bit mounting a cutting tip of special material in the tip end thereof without need for special assembly and centering jigs and without need for a final finish trimming operation on said special tip following the assembly operation, said method comprising forming a deep narrow slot diametrically across the tip end of a drill bit body, forming a pair of clearance passages extending longitudinally along the tip end of the bit and located in diametrically opposed quadrants one side wall of each of which opens through an opposite side wall of said slot with said clearance passages each having a surface diverging from one another from points close to one another and inclined acutely to the axis of said bit, supporting said bit generally vertically with said slot opening upwardly, inserting a finished cutting tip formed of abrasion resistant material into said slot and utilizing diverging shoulder surfaces on the opposite side faces of said tip in cooperation with the complementally shaped diverging surfaces of said clearance passages to guide said cutting tip accurately into centered assembly position in said slot, and then fusing said tip in assembled position.

3. That method of making a drill bit mounting a cutting tip of special material in the tip end thereof without need for special assembly and centering jigs and without need for a final finish trimming operation on said special tip following the assembly operation, said method comprising milling a pair of chip clearance passages in said tip end and confined generally to diagonally opposed quadrants of said tip end, slotting said tip end of the drill bit transversely thereof in an area between said pair of chip clearance passages with the opposite side walls of said slot opening into a different one of said clearance passages, one pair of said clearance passage walls diverging from one another rearwardly of the tip end of said bit at an acute angle to the longitudinal axis of said drill bit, and utilizing said diverging walls in cooperation with juxtaposed diverging shoulders on the opposite sides of a preformed cutting tip to guide said cutting tip into accurately centered assembled position in said slot, and fusing said cutting tip in assembled position while said bit is supported tip end uppermost.

4. That method of making a drill bit as defined in claim 3 characterized in rolling a plurality of spiral chip-conveying passages into the forward drilling end of said drill bit and opening into said chip clearance passages at the foremost end thereof.

5. That method of making a drill bit as defined in claim 3 characterized in forming said chip clearance passages so that each occupies substantially a full quadrant of the bit end and decreases in cross-sectional area from the foremost chip receiving ends thereof to the rearward chip discharging ends thereof.

6. That method of making a drill bit from uniform diameter rod stock which comprises the steps of reducing the diameter of said rod stock at spaced intervals therealong to form a drill mounting shank, cold rolling spiral chip-conveying grooves along the sections of said rod stock located between said reduced diameter shank sections, separating said rod into a plurality of drill bit bodies each having an integral shank end and a chip conveying end, slotting the latter end diametrically to seat a pre-molded cutting tip of special wear resistant material, forming the opposite ends of at least one side wall of said slot with rearwardly diverging shoulders lying at an acute angle relative to the rod stock, utilizing said shoulders in cooperation with mating shoulders on the side of said cutting tip to guide the latter accurately into centered assembled position in said slot, and holding said drill body and said cutting tip so assembled while welding the same rigidly together.

7. That method of making drill bits which comprises rigidly mounting a plurality of drill bit bodies in a rotatable indexing mount with the cutting tip ends outermost, indexing said mount past a plurality of work stations, slotting the outer ends of said drill bodies diametrically thereof at one of said work stations to receive a cutting tip, milling rearwardly diverging cutting tip seating shoulders into the opposite lateral ends of said slot at another of said work stations, supporting said drill bodies with said shouldered slots facing upwardly at still another of said work stations, dropping pre-formed cutting tips into said slots and utilizing complemental diverging shoulders thereon in cooperation with said drill body diverging shoulders to center said cutting tips accurately within said slots, and securing said tips rigidly in place in said slots while so centered.

References Cited in the file of this patent

UNITED STATES PATENTS

| | | |
|---|---|---|
| 714,890 | Gieshoidt | Dec. 2, 1902 |
| 826,525 | Peck | July 17, 1906 |
| 896,537 | Henn | Aug. 18, 1908 |
| 2,418,070 | Green | Mar. 25, 1947 |
| 2,635,856 | Schaffer | Apr. 21, 1953 |

FOREIGN PATENTS

| | | |
|---|---|---|
| 651,973 | Great Britain | Apr. 11, 1951 |
| 887,811 | France | Nov. 24, 1943 |